United States Patent [19]

Nishimura et al.

[11] Patent Number: 4,537,245
[45] Date of Patent: Aug. 27, 1985

[54] ZONE AIR-CONDITIONING CONTROL SYSTEM FOR MOTOR VEHICLE COMPARTMENT

[75] Inventors: Masao Nishimura, Anjo; Masami Mori; Akirou Yoshimi, both of Oobu, all of Japan

[73] Assignee: Nippondenso Co., Ltd., Kariya, Japan

[21] Appl. No.: 428,613

[22] Filed: Sep. 30, 1982

[30] Foreign Application Priority Data

Oct. 9, 1981 [JP] Japan .................. 56-161475

[51] Int. Cl.³ .................... F24F 3/044; F24F 7/06
[52] U.S. Cl. ........................ 165/22; 165/43;
165/16; 62/244; 236/49
[58] Field of Search .............. 165/42, 43, 12, 16,
165/22; 62/243, 244; 237/2 A, 5, 12.3 A;
236/49

[56] References Cited

U.S. PATENT DOCUMENTS

| | | | |
|---|---|---|---|
| 3,656,541 | 4/1972 | Coyle et al. | 165/42 X |
| 3,814,173 | 6/1974 | Coon | 165/22 X |
| 4,086,781 | 5/1978 | Brody et al. | 236/49 |
| 4,289,195 | 9/1981 | Bellot et al. | 165/16 X |
| 4,337,821 | 7/1982 | Saito | 165/12 |
| 4,347,712 | 9/1982 | Benton et al. | 236/49 |
| 4,355,760 | 10/1982 | Ruby | 165/22 X |
| 4,382,463 | 5/1983 | Ikebukuro | 165/43 X |

FOREIGN PATENT DOCUMENTS

56-2213 6/1979 Japan .
53-107449 3/1980 Japan ................ 165/43

Primary Examiner—William R. Cline
Assistant Examiner—John K. Ford
Attorney, Agent, or Firm—Cushman, Darby & Cushman

[57] ABSTRACT

A portion of an air-conditioning unit is divided into two so as to provide first and second air-mixing chambers each following first and second temperature adjustment mechanisms. The temperature of air in the first chamber is controlled independently of the temperature of air in the second chamber, while the first chamber communicates with a first group of air-conditioning zone or zones and the second chamber communicates with a second group of remaining zone or zones. Thus, the temperature of air fed to the first group can be controlled in a manner different from the temperature of air fed to the second group. A plurality of distributing valves are provided at air discharging outlets communicating with the first or second chambers, and the opening degree of each damper may be controlled so that air distribution amount may be controlled. The temperature of the air in each of the first and second chambers and the opening degree of each damper may be automatically controlled in accordance with temperature measurement signals, temperature settings and other information such as the intensity of sun light.

6 Claims, 12 Drawing Figures

ZONE AIR-CONDITIONING CONTROL SYSTEM FOR MOTOR VEHICLE COMPARTMENT

BACKGROUND OF THE INVENTION

This invention relates generally to a zone air-conditioning control or air conditioning system for the passenger compartment of a motor vehicle, and more particularly, the present invention relates to a zone air-conditioning control system which is capable of controlling the climate in air-conditioning zones covering each one of the passenger seats independently of each other.

Temperatures at various places in a passenger compartment of a motor vehicle are sometimes different from each other due to external influences such as sun light or the like. Furthermore, even if the temperature in the compartment is controlled to be uniform throughout various places in the compartment, the temperature at which a passenger feels comfortable is apt to be different for different passengers. Therefore, in some air-conditioning control systems known hitherto, air conditioning is effected in such a manner that its effect at each passenger's seat varies independently of the effect at other seats, or its effect is intentionally unbalanced.

According to the simplest example, air distribution is unbalanced by means of distribution valves provided in an air sending duct which leads temperature-conditioned air to a plurality of air discharging outlets provided at various places in the compartment. Although temperature difference is caused by the difference in airflow between various places in the compartment, a drastic unbalance in airflow is not preferable because the air conditioning felt by each passenger is subject to the changes in the airflow. For this reason it is difficult to provide a comfortable air-conditioning control, with which temperatures at all the places are kept uniform or a large temperature difference is provided, by only changing airflow. This also applies to other ways of providing airflow control, for example, by a plurality of electric fans each provided at each outlet for controlling airflow at each air outlet, or by providing a fin for the adjustment of the air blowing direction at each air outlet.

Apart from the control by airflow distribution change, it is also known that more than one temperature adjustment unit can be provided so that each covers a zone or region in the vehicle compartment. The best known example of this type is a so-called dual air-conditioning system having a main air-conditioning unit which controls the air around the front seat and a rear air-conditioning unit which controls the air around the rear seat, where these two units are respectively disposed at the front and rear of the compartment. Although this type of control is capable of controlling the temperature of each zone independently of the other zone, if the number of zones to be controlled is more than two, namely if each of the front and rear seats is divided into two zones of right seat and left seat, the above-mentioned control of airflow distribution change has to be used. Therefore, the control employing more than one temperature adjustment unit cannot provide satisfactory temperature adjustment.

According to another known example, a vehicle compartment is treated as a group of a plurality of air-conditioning zones, as disclosed in Japanese Patent Provisional Publication No. 56-2213, and at least one air outlet and a temperature adjustment unit are provided for each air-conditioning zone so that temperature control for each zone can be effected independently of other zones. It is known that the temperature of air blowing into each air-conditioning zone can be freely adjusted by controlling the corresponding temperature adjustment unit for the air-conditioning zone. However, in typical passenger motor vehicles, the passenger compartment has a space for four or more passengers. Therefore, at least four air-conditioning zones are needed, and thus at least four temperature adjustment units are needed. This makes the structure of the air-conditioning system complex and bulky. Furthermore, such a system requires a plurality of air ducts connected between the respective temperature adjustment units and the corresponding outlet or outlets, resulting an increase in the airflow resistance.

SUMMARY OF THE INVENTION

The present invention has been developed in order to remove the above-described drawbacks inherent in the conventional air-conditioning control systems for a motor vehicle passenger compartment.

It is, therefore, an object of the present invention to provide a zone air-conditioning control system which is capable of adjusting the temperature at four air-conditioning zones in the vehicle compartment with a simple structure.

The present invention has been achieved with an understanding that a factor which determines the desired temperatures at respective air-conditioning zones is affected by the structural property of a vehicle compartment. Assuming four air-conditioning zones of front right seat, front left seat, rear right seat and rear left seat, thermal influence due to sun light incident on the compartment through the front, rear or both sides of the compartment is apt to be given to passengers at only the front or rear of the compartment or to passengers at only the right or left side of the front and rear.

When a passenger other than the vehicle driver is seated, he or she sits on a seat next to the driver's seat or on the rear seat, and thus there may be a difference between desired temperatures by the driver and the passenger when one of them receives sun light.

From the above viewpoint, the four air-conditioning zones are divided into two groups, such as 1 zone to 3 zones, or 2 zones to the other 2 zones, so that different temperature air may be respectively given to the air-conditioning zones of each group, while different airflow may be given to the two or three air-conditioning zones in the same group.

To this end first and second temperature adjustment mechanisms each having a heat exchanger and means for controlling the amount of heat exchange are provided in such a manner that a single temperature adjustment unit is divided into two portions. Thus, two airflows having temperature difference therebetween are produced and delivered to the four air-conditioning zones through a plurality of air discharging outlets so that one of the following three control modes is established.

(A) The first airflow is given to the two air-conditioning zones at the front, while the second airflow is given to the remaining two air-conditioning zones at the rear.

(B) The first airflow is given to the two air-conditioning zones at the right, while the second airflow is given to the remaining two air-conditioning zones at the left.

(C) The first airflow is given to the front right (or left) seat, which is the driver's seat, while the second airflow is given to the remaining three air-conditioning zones.

In the above three modes, airflow may also be adjusted so that there is a difference in airflow between the right and left seats at the front and between the right and left seats at the rear in mode (A), between front and rear right seats and between front and rear left seats in mode (B), and between the remaining three seats in mode (C).

According to another object of the present invention, an automatic zone air-conditioning control system is provided in which actual temperature at each of the zones is detected so that the first and second temperature adjustment mechanisms as well as air outlet switching dampers are controlled so that desired temperature will be obtained at respective zones.

BRIEF DESCRIPTION OF THE DRAWINGS

The object and features of the present invention will become more readily apparent from the following detailed description of the preferred embodiments taken in conjunction with the accompanying drawings in which:

FIG. 4 including FIGS. 4A and 4B is a flowchart showing the operation of the digital computer shown in FIG. 3;

The same or corresponding elements and parts are designated with like reference numerals throughout the drawings.

DETAILED DESCRIPTION OF THE INVENTION

Figure 1:
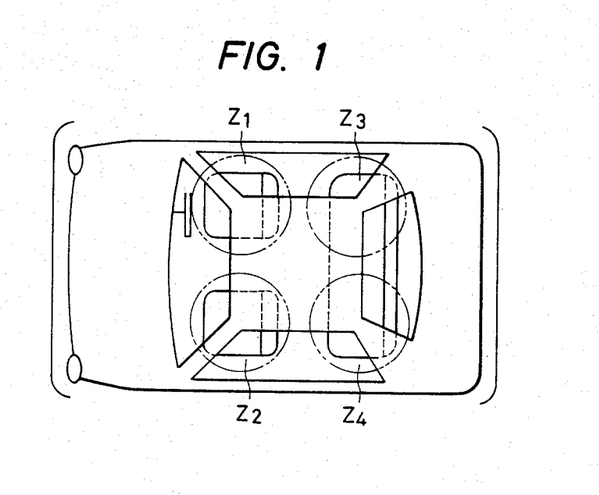
FIG. 1 is an explanatory diagram showing four air-conditioning zones in a motor vehicle passenger compartment.

Referring to FIG. 1 a typical passenger motor vehicle having a passenger compartment for four passengers is shown. In accordance with the present invention zone air-conditioning control is effected for four air-conditioning zones Z1 to Z4. A first zone Z1 includes the front right seat, a second zone Z2 includes the front left seat, a third zone Z3 includes the rear right seat, and a fourth zone Z4 includes the rear left seat.

Figure 2:
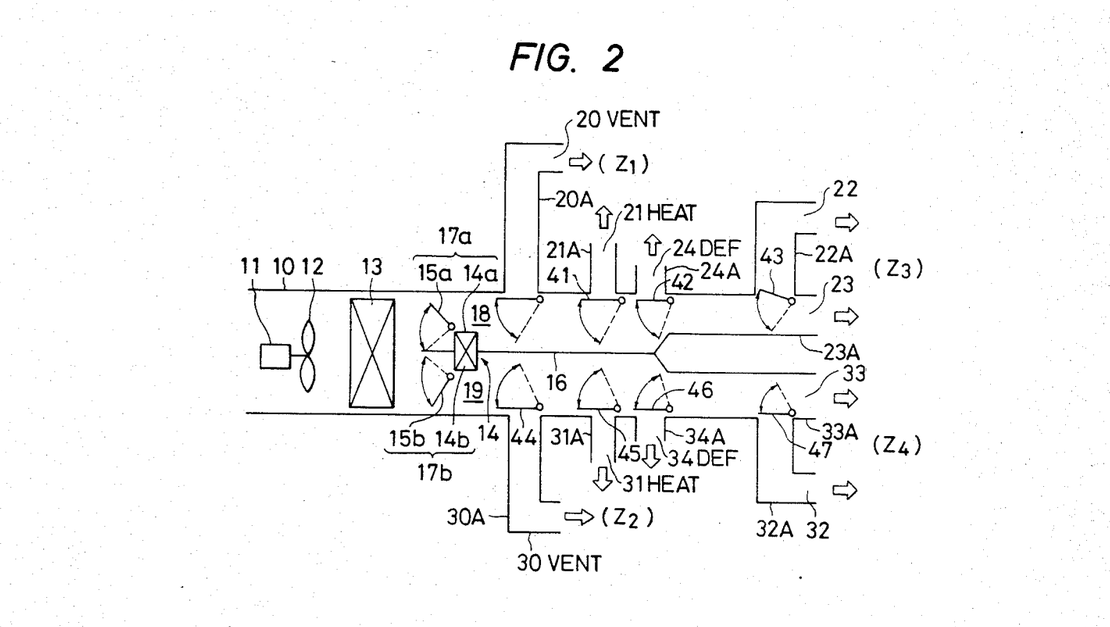
FIG. 2 is a schematic diagram showing an embodiment of the zone air-conditioning control system according to the present invention.

FIG. 2 shows the structure of an embodiment of the zone air-conditioning control system according to the present invention. In the following description, the first and third zones Z1 and Z3 corresponding to the front and rear right seats is treated as a first group or a first pair of air-conditioning zones and the second and fourth zones Z2 and Z4 corresponding to the front and rear left seats is treated as a second group or a second pair of air-conditioning zones. Designated at the reference 10 is an air-conditioning unit of the zone air-conditioning control system according to the present invention, and the air-conditioning unit 10 comprises an air inlet portion, air compression and sending portion, an air temperature adjusting portion, and air outlet portion communicating with the vehicle compartment of FIG. 1. The air-conditioning unit 10, which may be simply referred to as a unit hereafter, has an upstream end 11 communicating with an unshown air selection box through which external fresh air or internal recirculation air is led to the unit 10. The selection box may be manually operated by the vehicle passenger so that external air is introduced or internal air is recirculated in the same manner as in most conventional air-conditioning systems for motor vehicles.

In the unit 10 is disposed an electric blower fan 12 electrically connected to an unshown switching circuit so that airflow toward the compartment can be manually adjusted. The air sent downstream by the blower fan 12 is led to an air temperature adjusting portion comprising an evaporator 13 functioning as a cooling heat exchanger, a heater core 14 functioning as a heating heat exchanger, and a pair of temperature adjustment dampers 15a and 15b. The heater core 14 has a pair of halves 14a and 14b arranged to be exposed to first and second airflows respectively as will be described in detail later. The evaporator 13 is used as an element of a well known refrigerating system of the refrigerant recirculation type so that the air fed from the blower fan 12 is once cooled therewith.

The heater core 14 is interposed in the recirculation path of the engine coolant where the engine coolant is arranged to recirculate by means of an unshown water or coolant pump. The air led into the unit 10, therefore, is once cooled by the evaporator 13 and is then reheated by the heater core 14 when the cooled air is fed thereto. The heater core 14, which is a single unit, is divided into two halves 14a and 14b by means of a partition 16. Namely, the temperature adjusting portion is divided into two parts 17a and 17b which are independent of each other because the downstream portion of the air-conditioning unit 10 following the evaporator 13 is divided into two separate portions by the partition 16. The two parts of the divided temperature adjusting portion are respectively referred to as first and second temperature adjustment mechanisms 17a and 17b. The first temperature adjustment mechanism 17a comprises the above-mentioned first temperature adjustment damper 15a and the first half 14a of the heater core 14, while the second temperature adjustment mechanism 17b comprises the above-mentioned second temperature adjustment damper 15b and the second half 14b of the heater core 14. Each of the first and second temperature adjustment dampers 15a and 15b is connected via an unshown link mechanism to a manipulation lever provided in the passenger compartment so that the position of the dampers 15a and 15b may be manually adjusted at will. Designated at the references 18 and 19 are first and second air-mixing chambers, and the air temperature in these first and second air-mixing chambers 18 and 19 is respectively determined by the position of the temperature adjustment dampers 15a and 15b.

The first air-mixing chamber 18 communicating with the first temperature adjustment mechanism 17a communicates with a VENT outlet 20 disposed at the upper portion of the passenger compartment and a heater (HEAT) outlet 21 disposed at the lower portion of the passenger compartment where the outlets 20 and 21 face the first air-conditioning zone Z1. The first chamber 18 further communicates with a ventilator (VENT) outlet 22 and a HEAT outlet 23 both facing the third air-conditioning zone Z3, and with a defroster (DEF) outlet 24 provided close to the front windshield.

The second air-mixing chamber 19 communicating with the second temperature adjustment mechanism 17b communicates with a VENT outlet 30 disposed at the upper portion of the passenger compartment and a HEAT outlet 31 disposed at the lower portion of the passenger compartment where the outlets 30 and 31 face the second air-conditioning zone Z2. The second chamber 19 further communicates with a VENT outlet 32 and a HEAT outlet 33 both facing the fourth air-conditioning zone Z4, and with a DEF outlet 34 provided close to the front windshield.

The air-conditioning unit 10 is connected to these various air discharging outlets 20–24, 30–34 via ducts 20A–24A and 30A–34A, and at connecting portions between the unit 10 and these ducts are provided dampers 40–47 used for adjusting airflow to corresponding outlets. Among these dampers two dampers 43 and 47 also function as VENT/HEAT mode changing dampers so that the blowing mode at the third and fourth air-conditioning zones for the rear seats are changed thereby.

The zone air-conditioning control system of FIG. 2 operates as follows. The function of the blower fan 12, the evaporator 13 and the heater core 14 of the air-conditioning unit 10 is the same as in the conventional system. The system differs from conventional systems in that the temperature adjusting portion is divided into two parts to provide the above-mentioned first and second temperature adjustment mechanisms 17a and 17b because the downstream portion of the unit 10 is divided into two by the partition 16. As a result, the temperature of the air in the first air-mixing chamber 18 following the first temperature adjustment mechanism 17a can be controlled independently of the temperature of the air in the second air-mixing chamber 19.

When it is intended to make the unit 10 function as, a defroster, the dampers 40, 41, 44 and 45 are put in the solid line closed positions, and the dampers 42 and 46 are put in the dotted line open positions by means of an unshown manual lever. With the above-mentioned dampers 40–42 and 44–46 put in such positions, temperature-conditioned air is led via the air passages 24A and 34A to the defroster outlets 24 and 34.

Among the four air-conditioning zones Z1 to Z4, the temperature of the air led to the first and third zones Z1 and Z3 is selected freely by the first temperature adjustment mechanism 17a, while the temperature of the air led to the second and fourth zones Z2 and Z4 is selected freely by the second temperature adjustment mechanism 17b in the same way. Although the temperature of air fed to the first and third zones Z1 and Z3 is equal to each other, it is possible to change the heat quantity by varying the flow rate at the air outlets facing these zones. Namely, the dampers 40 to 43 may be controlled so that the heat quantity given to the first zone Z1 is greater than that given to the third zone Z3 or vice versa. Similarly, the heat quantity given to the second and fourth zones Z2 and Z4 may be controlled by means of the dampers 44 to 46.

In the above, although it has been described that the temperature of the first and second airflows fed to the first and second chambers 18 and 19 are controlled by the temperature adjustment dampers 15a and 15b, the flow rate of the coolant passing through the heater core 14 may be adjusted to either increase or decrease the temperature of the air in both the first and second air-mixing chambers 18 and 19 in the same direction.

Although the above-mentioned various dampers may be manually controlled, as described above, these dampers may be automatically actuated to establish a desired air-conditioning mode and set desired temperatures for each of the above-mentioned two groups of air-conditioning zones Z1 to Z4.

Figure 3:
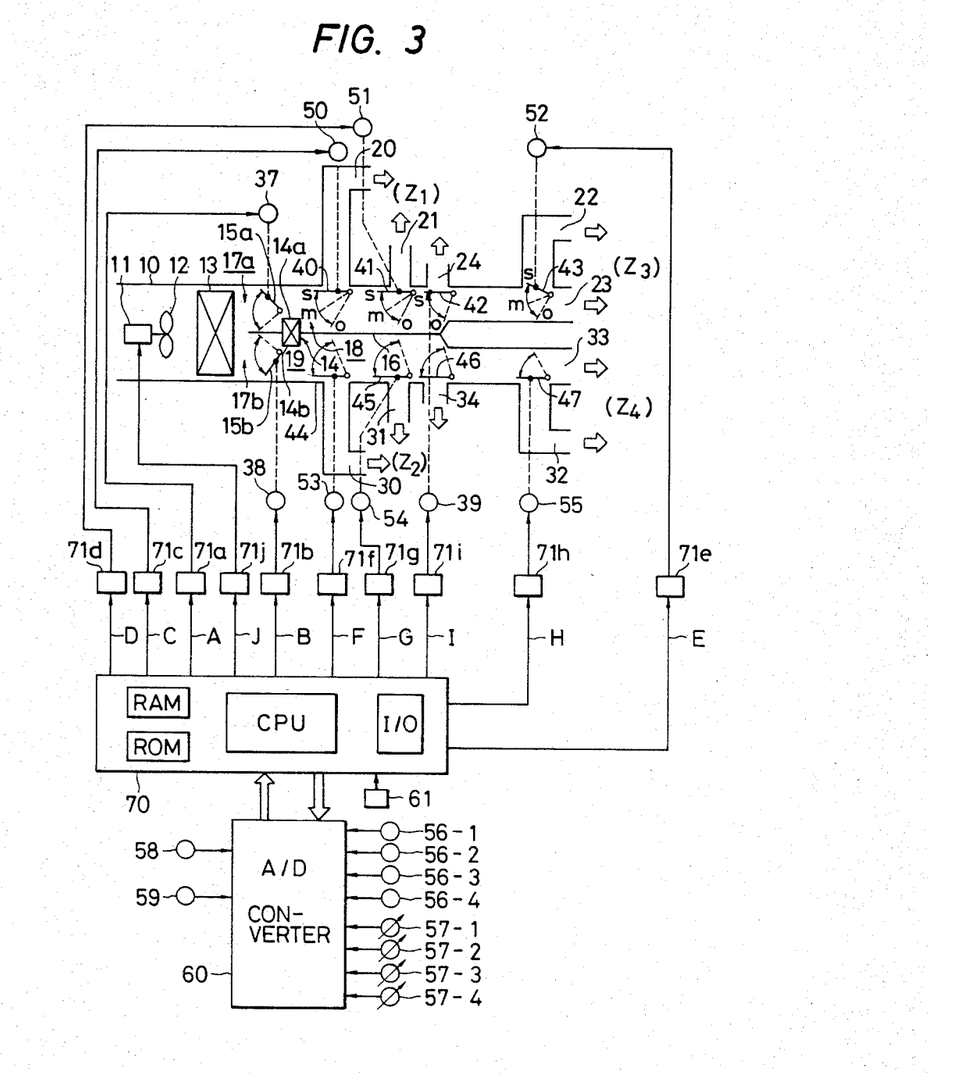
FIG. 3 is a schematic diagram showing another embodiment of the zone air-conditioning control system of the automatic control type.

Hence, reference is now made to FIG. 3 showing a schematic diagram of an embodiment of an automatic zone air-conditioning control system for a motor vehicle. The automatic zone air-conditioning control system of FIG. 3 comprises an air conditioning unit 10 in which various elements are arranged in the same manner as in the system of FIG. 2, and therefore, elements common to both FIGS. 2 and 3 are designated with the same reference numerals. A pair of electromechanical actuators 37 and 38 are provided so that the first and second temperature adjustment dampers 15a and 15b of the first and second temperature adjustment mechanisms 17a and 17b are respectively controlled independently of each other. Each of the actuators 37 and 38 comprises a driving unit, such as a servo motor, vacuum actuator or the like, and a mechanical linking mechanism so that the position of the dampers 15a and 15b are selected at will.

A single electromechanical actuator 39 is provided so that both the dampers 42 and 46, which interlock and function as distributing valves for the defroster outlets 24 and 34, are controlled in accordance with an electrical signal. The actuator 39 may be of the open-close type and comprises a driving unit, such as a servo motor, vacuum actuator or the like, and a mechanical linking mechanism so that the passages of the defroster outlets 42 and 46 are made open or closed.

In addition to the above-mentioned actuators 37, 38 and 39, six electromechanical actuators 50, 51, 52, 53, 54 and 55 are provided so that the dampers 40, 41, 43, 44, 45 and 47 provided for the air outlets 20, 21, 22, 23, 30, 31, 32 and 33 are controlled in accordance with electrical signals. Each of these electromechanical actuators 50 to 55 is designed to control the flow rate of the air emitted from the corresponding air outlet, and comprises a driving unit, such as a servo motor, vacuum actuator or the like, and a mechanical linking mechanism.

These electromechanical actuators 37 to 39 and 50 to 55 are controlled in accordance with corresponding electrical signals which are produced in a control unit 70, where the control unit is responsive to various information as will be described hereinbelow. Four temperature sensors 56-1, 56-2, 56-3 and 56-4 are provided so that temperatures at the four air-conditioning zones Z1 to Z4 are respectively detected. Each of the temperature sensors 56-1 to 56-4 comprises a heat-responsive resistor element exhibiting a variable resistance depending on the ambient temperature in a passenger compartment of a motor vehicle. Namely, a given current is applied to each of the heat-responsive resistor elements so that the voltage across the element is detected to produce an electrical signal indicative of the temperature. Temperature sensors 56-1 and 56-2 are disposed on the dash board at places difficult to be exposed to direct rays of the sun, while temperature sensors 56-3 and 56-4 are disposed on the back of the front seats at places difficult to be exposed to direct rays of the sun.

Four setting adjusters 57-1, 57-2, 57-3 and 57-4 are provided close to the temperature sensors 56-1 to 56-4 respectively. These setting adjusters 57-1 to 57-4 are employed for manually setting desired temperatures for each of the air-conditioning zones Z1 to Z4, and may be any type of signal generators which generate signals in accordance with the will of the passengers. For instance, each of the setting adjusters 57-1 to 57-4 can be a potentiometer so that the variable voltage therefrom indicates a temperature desired by each passenger seated in the corresponding air-conditioning zone.

In addition to these sensors 56-1 to 56-4 and setting adjusters 57-1 to 57-4 producing information from the interior of the passenger compartment, two sensors 58 and 59 are provided to detect external influence. The sensor 58 may be referred to as an external temperature sensor, and is disposed outside the passenger compartment so that it produces an electrical signal indicative of the outside air temperature. The other sensor 59 may be referred to as a sun light sensor, and is disposed inside the compartment at a place which is exposed to direct rays of the sun. For instance, the sun light sensor 59 may be disposed on the top of the dash board or top of the rear tray. Both of the sensors 58 and 59 are heat responsive resistors which exhibit variable resistance depending on the ambient temperature in a passenger compartment of a motor vehicle.

Although it is more preferable to detect the thermal influence due to direct rays of the sun at each of the air-conditioning zones Z1 to Z4, this embodiment is arranged such that the zone air-conditioning control system is capable of responding to thermal influence due to direct rays from the sun in each of the air-conditioning zones Z1 to Z4 by detecting the actual air temperature in each zone Z1 to Z4. If desired, a pair of sun light sensors 59 may be provided so that one is disposed at the top of the dash board and the other is at the top of the rear tray, with the pair of sensors 59 being connected in series.

The above-mentioned various pieces of information or input variables from the sensors 56-1 to 56-4, the setting adjusters 57-1 to 57-4 and the sensors 58 and 59 are fed to an analog-to-digital (A/D) converter 60 so that various analog signals are converted into binary coded digital signals which are adapted for digital processing in the control unit 70. The A/D converter 60 comprises a multiplexer which selects or gates one of its input analog signals, and a converter which converts the gated analog signal into a binary code.

A switch panel 61 is provided for receiving instructions from the vehicle passengers. The switch panel 61 comprises a plurality of switching elements (not shown) including a switching element for producing a command signal with which the zone air-conditioning control system is put in automatic control mode, a group of switching elements for producing command signals with which each of the electromechanical actuators 50 to 55 are controlled so that position of the associated distributing valves are controlled, and a group of switching elements for producing command signals with which the above-mentioned temperature adjustment dampers 15a and 15b are continuously moved in an arbitrary direction, i.e. toward cooling mode or heating mode, as long as the switches are manipulated.

Therefore, when the first mentioned switching element group is not manipulated, the automatic zone air-conditioning control system of FIG. 3 may be manually controlled in the same manner as the embodiment of FIG. 2 with the manipulated of the remaining switching element groups.

The control unit 70 is constructed of a digital microcomputer so that digital signals from the A/D converter 60 are processed to control the above-mentioned various dampers and some other elements in the zone air-conditioning control system. The digital computer 70 comprises a CPU, a ROM, a RAM, and an I/O device in the same manner as typical microcomputers. A predetermined control program is stored in the ROM in advance so that the control program is read out therefrom by a unit of instructions in a sequence. Thus, the CPU executes the unit of read out instructions. During execution, some data are temporarily stored in the RAM, and input and output data are transferred through the I/O device. Some bus lines (not shown) are also provided so that data are transferred between these elements in the microcomputer 70.

The digital computer 70 receives the above-mentioned various pieces of information in a sequence from the A/D converter 60, and stores them temporarily in the RAM. The stored information or data are processed by the CPU to obtain some resultant data or signals in such a manner that a given signal is fed to a given designated output terminal among a plurality of output terminals. When one cycle of a series of processings is terminated, the processing cycle is again repeated.

The resultant data obtained at the output terminals of the digital computer 70 are used to control the above-mentioned various electromechanical actuators 37–39 and 50–55 and the blower fan 12. In detail the resultant data or signals, which are designated at the references A to J, are first applied to converters 71a to 71j, and the converted signals are then fed to the actuators 37–39 and 50–55 and the blower fan 12. These output signals A to J may be divided into several groups from their functions, such as first group signals A, B for controlling the position of the first and second dampers 15a and 15b of the first and second temperature adjustment mechanisms 17a and 17b; second group signals C, D, E, F, G, H, I for controlling the position of the distributing valves 40–47; and third group signal J for controlling the blowing ability of the blower fan 12 in accordance with temperature adjustment commands against the first and second temperature adjustment mechanisms 17a and 17b.

The converter 71i may be a relay which performs switching because the electromechanical actuator 39 connected thereto is needed for on-off or bistable operation. Each of the remaining actuators 71a to 71h, however, comprises a D/A converter for converting the output digital signals A to H to analog signals, and a servo amplifier which is responsive to the converted analog signal. Thus, the actuators 71a to 71h control associated dampers so that the position thereof is selected. If desired, a position sensor may be provided for detecting the position of a connecting rod between each actuator and its associated damper except for the dampers 42 and 46 so that feedback control may be established.

Figures 4, 4A:
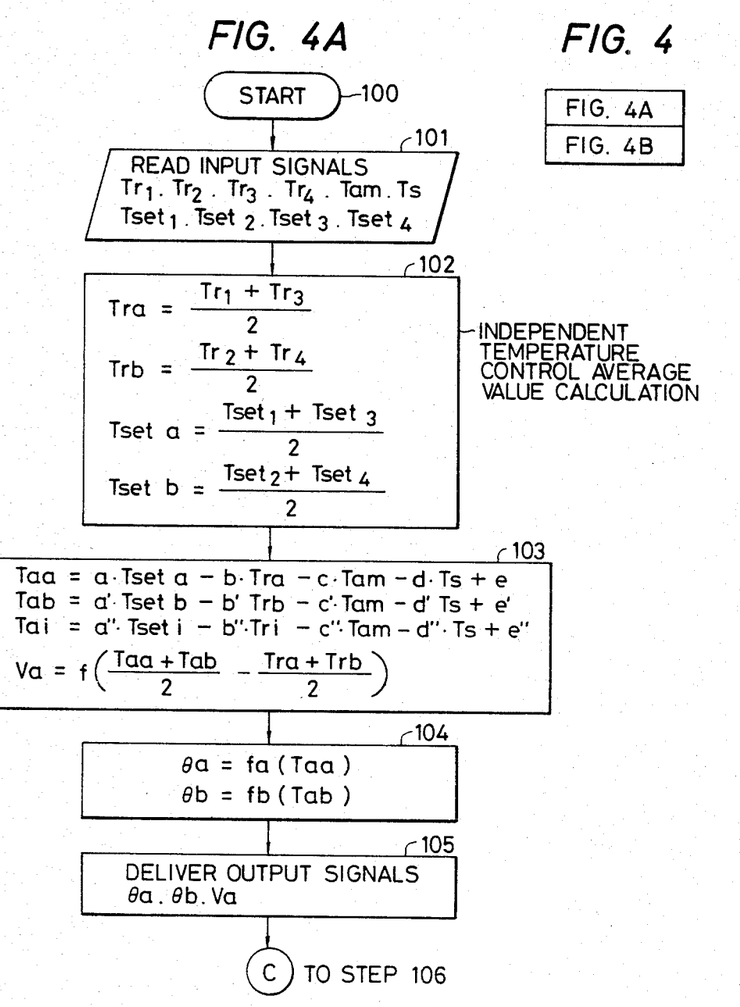
Figure 4B:
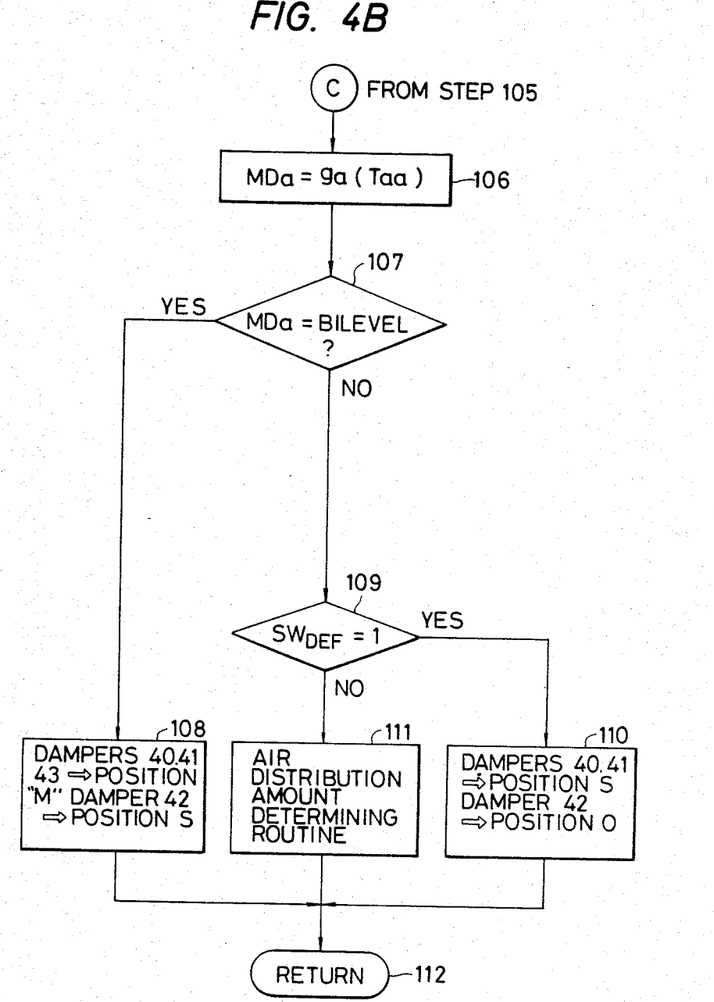

FIG. 4 including FIGS. 4A and 4B shows a flowchart of the control program for the digital computer 70, and the operation of the digital computer 70 will be described with reference to FIG. 4. The digital computer 70 starts its operation from the first address of the control program when an unshown main switch is turned on. At the beginning of the operation, the state of manipulation of the switching elements on the switch panel 61 is detected. If the first group of switching elements has been manipulated or none of the remaining switching element groups for manual operations have yet been manipulated, the control program of FIG. 4 is executed from step 100 repeatedly at a given interval.

In step 101, the digital computer 70 stores various signals applied via the A/D converter 60 from the sensors 56-1 to 56-4, 58 and 59 and the setting adjusters 57-1 to 57-4 in the RAM. In this step 101, the digital computer 70 produces a command signal with which one of the analog signals fed to the A/D converter 60 is selected, and a command signal with which the selected analog signal is converted into a binary coded digital value. These command signals are fed to the A/D converter 60 so that converted digital signals are fed to the digital computer 70 in a sequence. Temperature data from the temperature sensors 56-1 to 56-4 disposed in respective air-conditioning zones Z1 to Z4 are expressed in terms of Tr1, Tr2, Tr3 and Tr4. Similarly, setting temperature data from the four temperature setting adjusters 57-1 to 57-4 are Tset1, Tset2, Tset3 and Tset4; outside temperature data from the outside temperature sensor 58 is Tam; and sun light data from the sun light sensor 59 is Ts. These various data are temporarily stored in given addresses of the RAM. In order to insure the stability of these data several consecutive values for each data may be averaged to obtain an average value indicative of the most recent data. In this case each average value is stored in the RAM when obtained.

After step 101, an independent temperature control average value calculating step 102 takes place so that average temperatures Tra and Trb in the pair of groups of the air-conditioning zones Z1, Z3 and Z2, Z4, which are respectively covered by the first and second temperature adjustment mechanisms 17a and 17b, and average setting temperatures Tseta and Tsetb therefor are obtained from the actual temperatures Tr1 to Tr4 and the setting temperatures Tset1 to Tset4, and are temporarily stored in the RAM.

Then a control temperature calculating step 103 is executed in which average necessary temperatures Taa and Tab of the air from the first and second temperature adjustment mechanisms 17a and 17b and necessary temperatures Tai (i=1 to 4) at air outlets at each zone are calculated. The necessary temperature data Ta1 to Ta4 are kind of targets which are necessary to cause the data Tra and Trb indicative of the average temperatures in the first and second groups of the air-conditioning zones Z1 to Z4 to approach the data Tseta and Tsetb indicative of average setting temperatures in these zone groups. However, since both the first and third air-conditioning zones Z1 and Z3 communicate with the first temperature adjustment mechanism 17a, there would be no difference in actual temperature between air discharged through outlets at the first and third zones Z1 and Z3. Similarly, there would be no difference in actual temperature between air discharged through outlets at the second and fourth zones Z2 and Z4. These data Ti will be used, as will be described later, to determine air distribution amount between outlets of the same group. This calculation is made in accordance with formulas including various constants a, b, c, d, e, a' ... e', a'' ... e'' which are predetermined in accordance with experimentation based on the structure of the vehicle and the air-conditioning unit 10.

Figure 5:
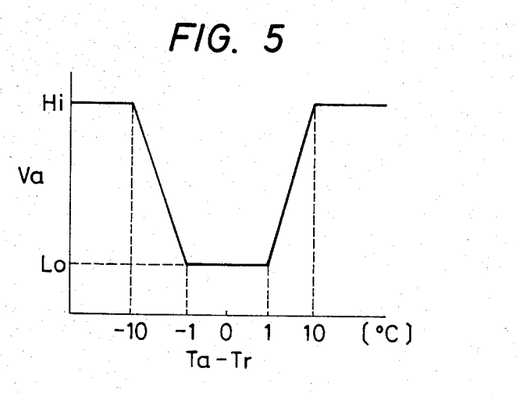
FIG. 5 is an explanatory diagram showing the control of the fan shown in FIG. 3.

In addition, in order to change the blowing ability of the blower fan 12 in accordance with the temperature control, data Va indicative of the voltage to be applied to the blower fan 12 is calculated by using a formula corresponding to the difference between the average blowing out air temperature data Taa and Tab, and the average compartment air temperature data Tra and Trb. This data Va is obtained by using a given formula corresponding to difference data (Ta−Tr) or by using a map formed in a program memory. FIG. 5 shows the variation in data Va with respect to the difference Ta−Tr. In FIG. 5, when the temperature difference (Ta−Tr) between Ta and Tr is in the range of 31 1° C. to +1° C., Va is established at a lower level (Lo), and, when the temperature difference is greater than °C. or +10° C., Va is established at a higher level (Hi). Therefore, Va is varied in the range between −10 and −1 or 1 and 10 .

In the following step 104, necessary opening degrees of the first and second temperature adjustment dampers 15a and 15b for obtaining the average necessary temperatures Taa and Tab are obtained. Namely, the necessary opening degrees expressed in terms of $\theta a$ and $\theta b$ are calculated as functions of Taa and Tab. After step 104, the data of the necessary opening degrees $\theta a$ and $\theta b$ and the voltage Va to be applied to the blower fan 12 are respectively delivered to the actuators 71a, 71b and 71j in step 105.

After the above-mentioned data $\theta a$, $\theta b$ and Va have been determined, it is necessary to determine the amount of air distribution for to the air outlets communicating with the first and second chambers 18 and 19. Since the first and second air-mixing chambers 18 and 19 respectively following the first and second temperature adjustment mechanisms 17a and 17b are identical to each other, description will be made only for the first chamber 18.

Figure 6:
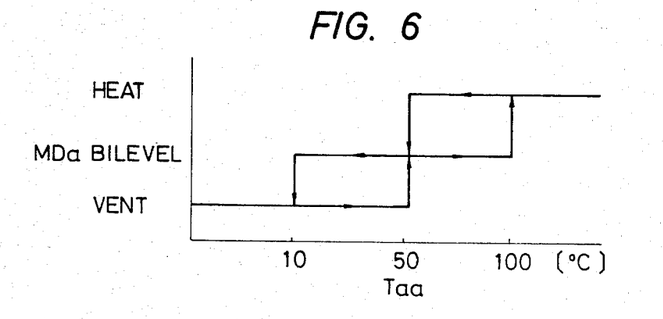
FIG. 6 is an explanatory diagram showing the control of the air outlets.

Prior to determining the amount of air distribution, it must first be determined which mode of air discharge is needed. To this end, a discharging mode function is obtained as a function of the average temperature Taa in step 106 of FIG. 4. FIG. 6 shows the relationship between the discharging mode variation and the average temperature Taa. Three modes, namely, of HEAT, BI-LEVEL, and VENT are provided, and one of these modes is selected in accordance with the value of Taa and the direction of variation. In the HEAT mode, warm air is discharged from the HEAT outlet 21. In the BI-LEVEL mode, warm air is also discharged from the HEAT outlet 21, and warm air whose temperature is slightly lower than that of the warm air from the HEAT outlet 21 is discharged from the VENT outlet 20. In the VENT mode, cool air is discharged from the VENT outlet 20. The switching points between these three modes are 10, 50 and 100 degrees centigrade in the value of the average necessary temperature Taa.

Subsequent to step 106, it is detected whether the selected discharging mode is of the BI-LEVEL mode or not in step 107. If the answer of step 107 is YES, namely, when the BI-LEVEL mode has been set, output signals C, D and E are fed to the actuators 71c, 71d and 71e so that the associated dampers 40, 41 and 43 are put in an intermediate position "m" shown in FIG. 3, and an output signal I is fed to the actuator 71i so that the associated damper 42 is put in a closed position S.

If the answer of step 107 is NO, namely, when a discharging mode other than the BI-LEVEL mode has been set, it is detected whether a defroster switch $SW_{DEF}$ on the switch panel 61 has been manipulated or not in step 109. The defroster switch is arranged to produce a logic "1" signal when manipulated, and thus the answer of step 109 becomes YES when $SW_{DEF}=1$. When the answer of step 109 is YES, step 110 is executed in which output signals C, D and I are fed to the actuators 71c, 71d and 71i so that the dampers 40 and 41 are put in closed position S and the damper 42 is put in open position 0. From the above, it will be understood that the amount of discharging air distribution is fixed to one of two distribution modes respectively set by the steps 108 and 110. Thus, when one of steps 108 and 110 is executed, air distribution is not changed by temperature information or signals.

On the other hand, if the answer of step 109 is NO, namely when the defroster mode has not been selected, step 111 is executed in which the air distribution amount to the various discharging outlets is determined. The step 111, which may be referred to as an air distribution amount determining routine, is shown in detail in FIG. 7.

Figure 7:
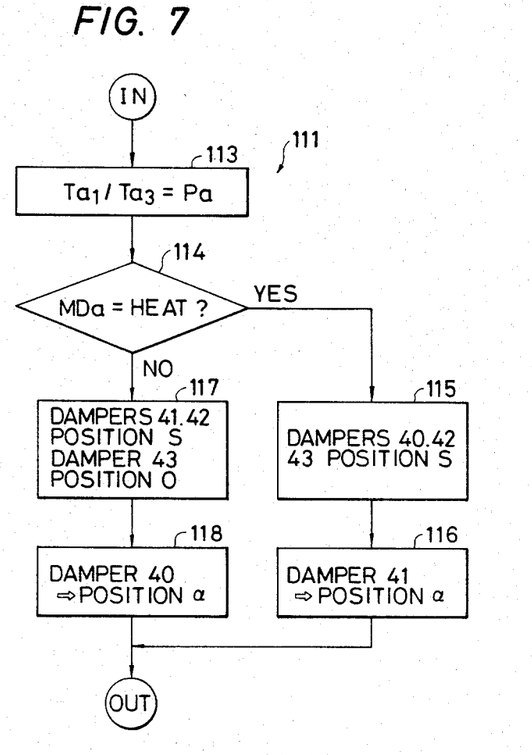
FIG. 7 is a detailed flowchart of the step 111 of the flowchart of FIG. 4B.
Figure 8:
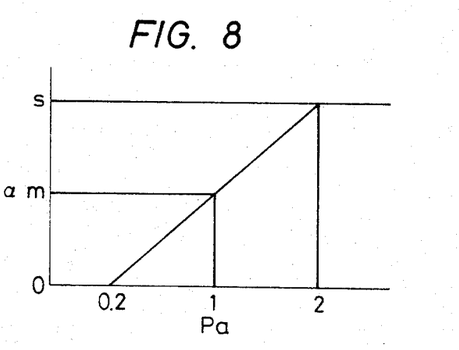
FIG. 8 is an explanatory diagram showing the control of airflow distribution.

In the air distribution amount determining routine 111 of FIG. 7, a ratio Pa between the necessary air temperatures Ta1 and Ta3 at outlets 20 and 22 is obtained. Similarly, a ratio Pb between the necessary air temperatures Ta2 and Ta4 at outlets 30 and 32 is obtained for the other chamber 19. In a following step 114, it is detected whether the above-mentioned air discharging mode set in step 106 is of the HEAT mode or not. If YES, namely, when in the HEAT mode, output signals C, I and E are fed to the actuators 71c, 71i and 71e in step 115 so that the associated dampers 40, 42 and 43 are put in closed position S, and then in step 116, an output signal D is fed to the actuator 71d so that the associated damper 41 is put in a position $\alpha$ which is a variable position between the closed and open positions S and O. The variable position $\alpha$ is determined as a function of the above-mentioned ratio Pa as shown in the graph of FIG. 8. As a result, dampers 40, 42, and 43 are closed, and the position of the damper 41 is set to the variable position $\alpha$ so that air distribution amount to the outlets 21 and 23 is determined.

If the answer of step 114 is NO, namely, when in VENT mode, output signals D, I and E are fed to the actuators 71d, 71i and 71e in step 117 so that the associated dampers 41 and 42 are put in closed position S, and the damper 43 is put in open position O, then in step 118, an output signal C is fed to the actuator 71c so that the associated damper 40 is put in a variable position $\alpha$, which variable position $\alpha$ is determined as a function of the above-mentioned ratio Pa as shown in the graph of FIG. 8. As a result, the dampers 41 and 42 are rendered closed and the damper 43 is rendered open, while the position of the damper 41 is set to the variable position $\alpha$ so that the air distribution amount to the outlets 20 and 22 is determined.

Although the air distribution amount determining routine 111 is described with reference to FIG. 7 in connection with only the first chamber 18, remaining dampers 44 to 47 of the second chamber 19 will be controlled in the same manner as the dampers 40 to 43.

The above described embodiments may be modified in various ways as follows:

(1) Although the evaporator 13 is placed at a point upstream of the first and second temperature adjustment mechanisms 17a and 17b so as to be common to both the mechanisms 17a and 17b for supplying thereto dehumidified air, such a cooling and reheating system is not necessary to the present invention. In other words, another type of refrigerating or cooling system may be employed although the refrigerating and reheating system employed in the present invention is preferable because it makes more comfortable air.

(2) Instead of the single evaporator 13 two separate refrigerating units such as evaporators may be respectively provided for the first and second temperature adjustment mechanisms 17a and 17b so that each refrigerating unit may be controlled independently of the other providing a more complex control of the discharging air for each air-conditioning zone.

(3) The heater core 14, which is a single unit in the above-described embodiments, may be replaced with two separate heater cores so that temperature in the first and second air-mixing chambers 18 and 19 may be independently controlled by changing the flow rate of the engine coolant. In this case, the first and second temperature adjustment dampers 15a and 15b may be omitted.

(4) The four temperature setting adjusters 57-1 to 57-4 provided in the four air-conditioning zones Z1 to Z4 may be replaced with a single temperature setting adjuster with which a common temperature setting is given. With such a single temperature setting adjuster the temperature of air discharged into each air-conditioning zone will be controlled so as to maintain the temperature in each zone at the setting point even if external thermal influence is differently given to each zone.

(5) It is preferable to detect the intensity of sun light incident on each air-conditioning zone so that the temperature in each zone is maintained at the setting point with a quick response and high accuracy against external thermal influence. When sun light intensity or degree is detected at each zone, each data thereof may be used in calculation of the necessary temperature for the discharging air at each zone.

(6) On the contrary, in the case that high accuracy is not needed, the sun light sensor 59 may be omitted. In this case, the temperature sensors 56-1 to 56-4 at respective air-conditioning zones Z1 to Z4 may be placed at such places where influence due to sun light is slightly given.

Figure 9:
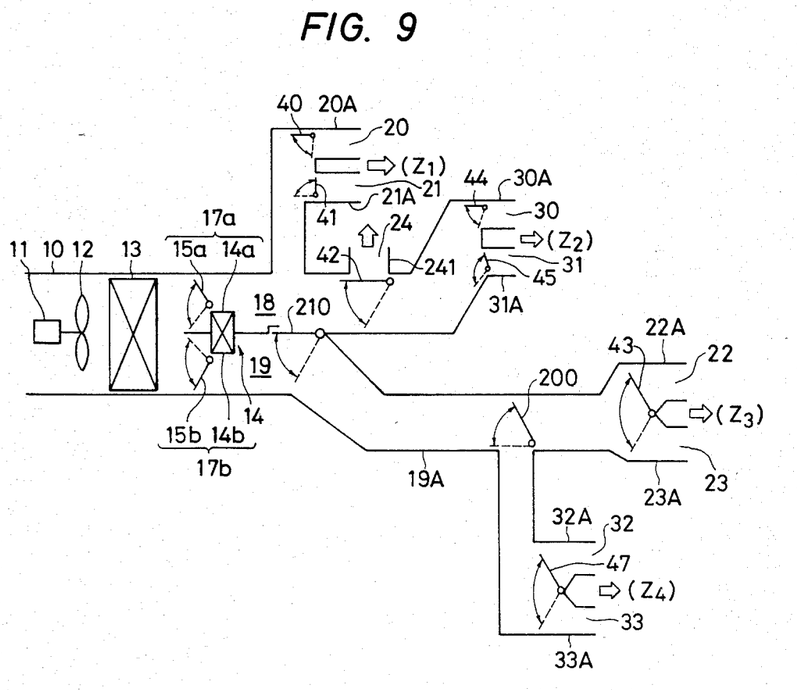
FIG. 9 is a schematic diagram showing another embodiment of the zone air-conditioning control system according to the present invention.

(7) Although in the above-described embodiments, the first and third zones Z1 and Z3 are combined as the first group and the second and fourth zones Z2 and Z4 are combined as the second group, first and second zones Z1 and Z2 may be combined as the first group or a front seat group communicating with the first temperature adjustment mechanism 17a, and the third and fourth zones Z3 and Z4 may be combined as the second group or a rear seat group communicating with the second temperature adjustment mechanism 17b. Such a variation of the present invention is shown in FIG. 9. The second air-mixing chamber 19 following the second temperature adjustment mechanism 17b communicates with the rear seat group including the third and fourth air-conditioning zones Z3 and Z4 via a duct 19A. The defroster outlet 34 in the embodiment of FIGS. 2 and 3 is omitted because only the other defroster outlet 24 is used. Accordingly, the duct 34A and the damper 46 associated with the defroster outlet 34 are omitted. A damper 200 is newly provided in the duct 19A at a branch where the duct 19A is branched off toward the third and fourth zones Z3 and Z4 so that the air distribution amount to these zones Z3 and Z4 is controlled by the position of the damper 200. Another damper 210 may be provided so that all the airflow is led to the first and second zones Z1 and Z2 of the front seat group with the duct 19A closed thereby.

Figure 10:
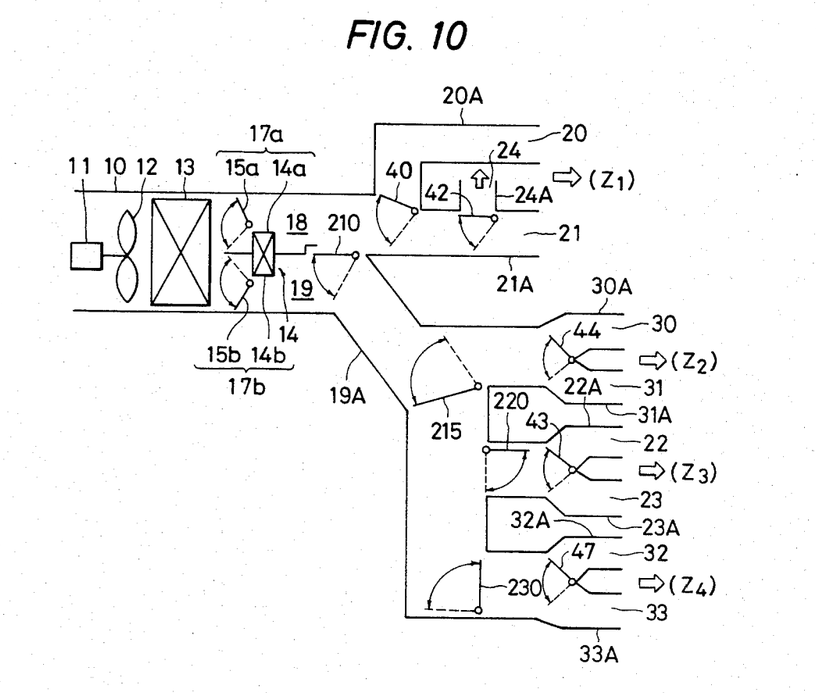
FIG. 10 is a schematic diagram showing another embodiment of the zone air-conditioning control system according to the present invention.

(8) In another combination of air-conditioning zones, if the first zone Z1 covering the driver's seat is treated as one group and the remaining three zones Z2 to Z4 are combined in the other group, the first temperature adjustment mechanism 17a is arranged to communicate with the first zone 1, while the second temperature adjustment mechanism 17b is arranged to communicate with the second to fourth zones Z2 to Z4 via the duct 19A as shown in FIG. 10. In this case, a damper 215 is provided in the duct 19A at a branch where the duct 19A is branched off toward the second zone Z2 and to a group of the third and fourth zones Z3 and Z4 so that air distribution amount to the second zone Z2 and to the group of the third and fourth zones Z3 and Z4 is controlled by the position of the damper 215. Other dampers 220 and 230 for opening and closing the air passages communicating with the third and fourth zones Z3 and Z4 are respectively provided so that the air distribution amount to the third and fourth zones Z3 and Z4 is respectively controlled thereby.

The above described embodiments of FIGS. 9 and 10 may also be controlled by the control unit 10 having a digital computer so that the zone air-conditioning control system operates as an automatic zone air-conditioning control system in the same manner as the above-described embodiment of FIG. 3.

The above-described embodiments are just examples of the present invention, and therefore, it will be apparent to those skilled in the art that many modifications and variations may be made without departing from the spirit of the present invention.

What is claimed is:

1. A zone air-conditioning control system for use with a motor vehicle, comprising:
   (a) an air-conditioning unit having:
      a single duct for leading incoming air thereinto,
      a refrigerating unit disposed in said single duct for cooling air led into said single duct,
      first and second ducts respectively communicating with said single duct at a downstream portion of said single duct, and
      first and second temperature adjustment mechanisms respectively disposed in said first and second ducts, each of said first and second temperature adjustment mechanisms including a heat exchanger, for heating air passing therethrough, and being provided for controlling the amount of heat exchanged;
   (b) first to fourth branch ducts for distributing temperature-controlled air to first to fourth air-conditioning zones established in the passenger compartment of said motor vehicle, said air-conditioning zones being respectively defined by the front right seat area, the front left seat area, the rear right seat area, and the rear left seat area of the passenger compartment, said first and third branch ducts being communicated to said first duct and being related to said first temperature adjustment mechanism, and said second and fourth branch ducts being communicated to said second duct and being related to said second temperature adjustment mechanism, said first branch duct communicating with said first air-conditioning zone, said second branch duct communicating with said second air-conditioning zone, said third branch duct communicating with said third air-conditioning zone, and said fourth branch duct communicating with said fourth air-conditioning zone;
   (c) first and second flow rate changing means for changing the flow rate of air flowing through said branch ducts, said first flow rate changing means being disposed in said first duct, and said second flow rate changing means being disposed in said second duct;
   (d) temperature detecting means for generating electrical signals each indicative of the temperature of air in each of said air-conditioning zones;
   (e) temperature setting adjusters with which a desired temperature in each of said first to fourth air-conditioning zones can be set;
   (f) a control unit for controlling said first and second temperature adjustment mechanisms and said first and second flow rate changing means in accordance with electrical signals from said temperature detecting means and electrical signals from said temperature setting adjusters so as to cause temperature detected in each of said first to fourth air-conditioning zones to approach temperature set by means of said temperature setting adjusters, said control unit controlling said first temperature adjustment mechanism in accordance with each difference between said set temperature and said detected temperature in said first and third air-conditioning zones and controlling said second temperature adjustment mechanism in accordance with each difference between said set temperature and said detected temperature in said second and fourth air-conditioning zones, said control unit controlling said first flow rate changing means to proportion a first distribution amount of temperature-controlled air to be supplied between said first air-conditioning zone and said third air-conditioning zone and controlling said second flow rate changing means to proportion a second distribution amount of temperature-controlled air to be supplied between said second air-conditioning zone and said fourth air-conditioning zone; and
   (g) actuating means for actuating said first and second temperature adjustment mechanisms and said first and second flow rate changing means in accordance with commands from said control unit.

2. A zone air-conditioning control system as claimed in claim 1, wherein said refrigerating unit comprises an evaporator for cooling said incoming air.

3. A zone air-conditioning control system as claimed in claim 1, wherein the combination of said two heat exchangers respectively comprises a single heater core disposed such that it is exposed to air in both of said first and second ducts.

4. A zone air-conditioning control system as claimed in claim 1, wherein each of said first and second temperature adjustment mechanisms comprise a damper for controlling the amount of air flow to be reheated, respectively, by each of said heat exchangers.

5. A zone air-conditioning control system as claimed in claim 1, further comprising a heat outlet provided at a lower portion of each one of said air-conditioning zones, a vent outlet provided at an upper portion of each one of said air-conditioning zones and at least one damper for each one of said air-conditioning zones for controlling the distributing portion of air discharged through said heat and vent outlets.

6. A zone air-conditioning control system as claimed in claim 1, further comprising:
- a temperature sensor for detecting the temperature of air outside of the passenger compartment;
- a temperature sensor disposed at a place easy to be exposed to direct rays of the sun for detecting the intensity of sun light incident on the passenger compartment;

wherein said control unit comprises an electronic control unit arranged to calculate average temperatures Tra and Trb in a first group of zone or zones and in a second group of zone or zones; to calculate average setting temperatures Tseta and Tsetb in said first and second groups; to calculate a first necessary temperature Taa in said first chamber and a second necessary temperature Tab in said second chamber in accordance with the following formulas:

$$Tra = \frac{Tr1 + Tra3}{2}$$

$$Trb = \frac{Tr2 + Tra4}{2}$$

$$Tseta = \frac{Tset1 + Tset3}{2}$$

$$Tsetb = \frac{Tset2 + Tset4}{2}$$

$$Taa = a \cdot Tseta - b \cdot Tra - c \cdot Tam - d \cdot Ts + e$$
$$Tab = a' \cdot Tsetb - b' \cdot Trb - c' \cdot Tam - d' \cdot Ts + e'$$

wherein

Tr1 to Tr4 are measured temperatures in said first to fourth air-conditioning zones;

Tset1 to Tset4 are temperature settings respectively set for said first to fourth air-conditioning zones;

Tam is a measured temperature of outside air;

Ts is data indicative of the intensity of the sun light incident on said passenger compartment; and a, b, c, d, e, a', b', c', d', and e' are constants defined by the structure of said passenger compartment and said air-conditioning unit;

a blower fan for sending incoming air to said refrigerating unit; and wherein said electronic control unit is arranged to calculate necessary temperatures Tai, wherein i is 1, 2, 3 and 4, of air to be discharged into said first to fourth air-conditioning zones and to calculate a voltage Va, to be applied to said blower fan for controlling said blower fan, in accordance with the following formulas:

$$Tai = a'' \cdot Tseti - b'' \cdot Tri - c'' \cdot Tam - d'' \cdot Ts + e''$$

$$Va = f\left( \frac{Taa + Tab}{2} - \frac{Tra + Trb}{2} \right)$$

wherein a'', b'', c'', d'' and e'' are constants defined by the structure of said passenger compartment and said air-conditioning unit; and f indicates a given function said calculated necessary temperatures acting as targets by which said calculated average temperatures are caused to approach said average setting temperatures.

* * * * *